May 23, 1933. K. W. HALLDEN 1,911,150
SHEARING APPARATUS FOR CUTTING POSITIVE LENGTHS
Filed March 2, 1931 3 Sheets-Sheet 3
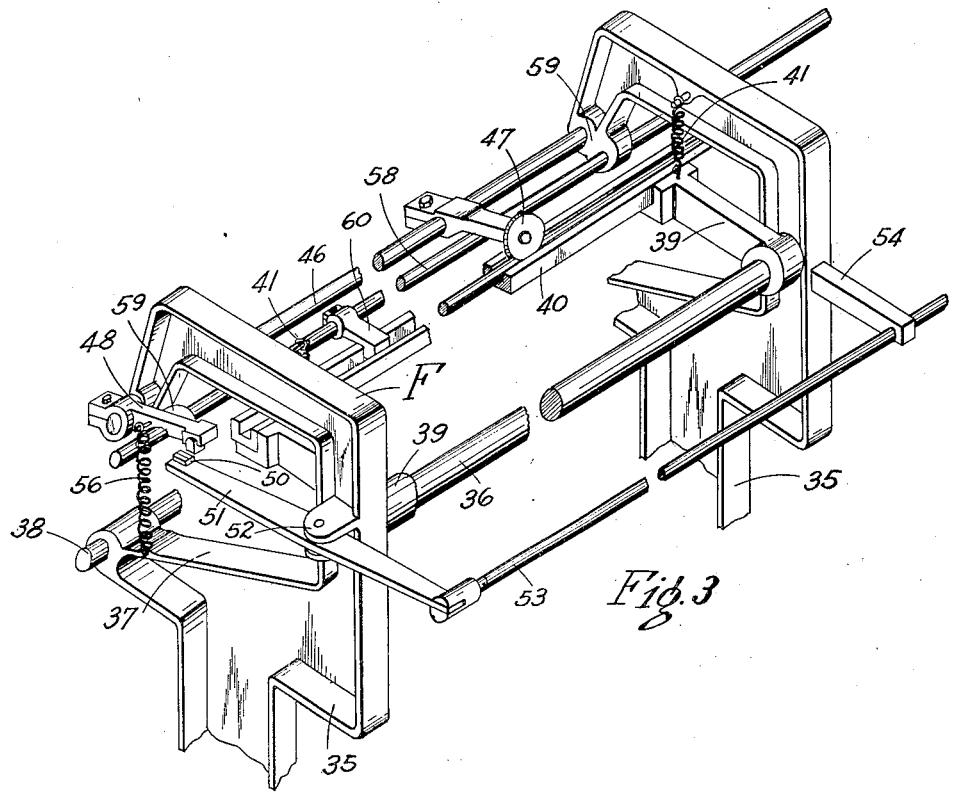
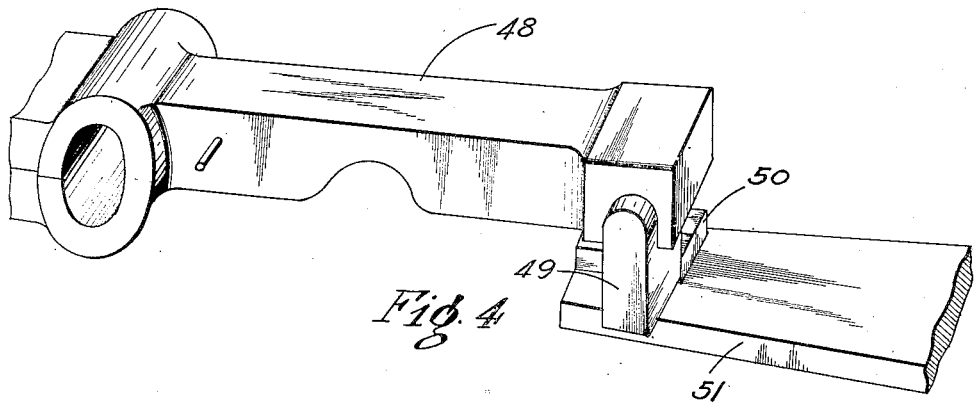
Inventor
KARL WILLIAM HALLDEN
Richey & Watts
By
Attorneys Patented May 23, 1933

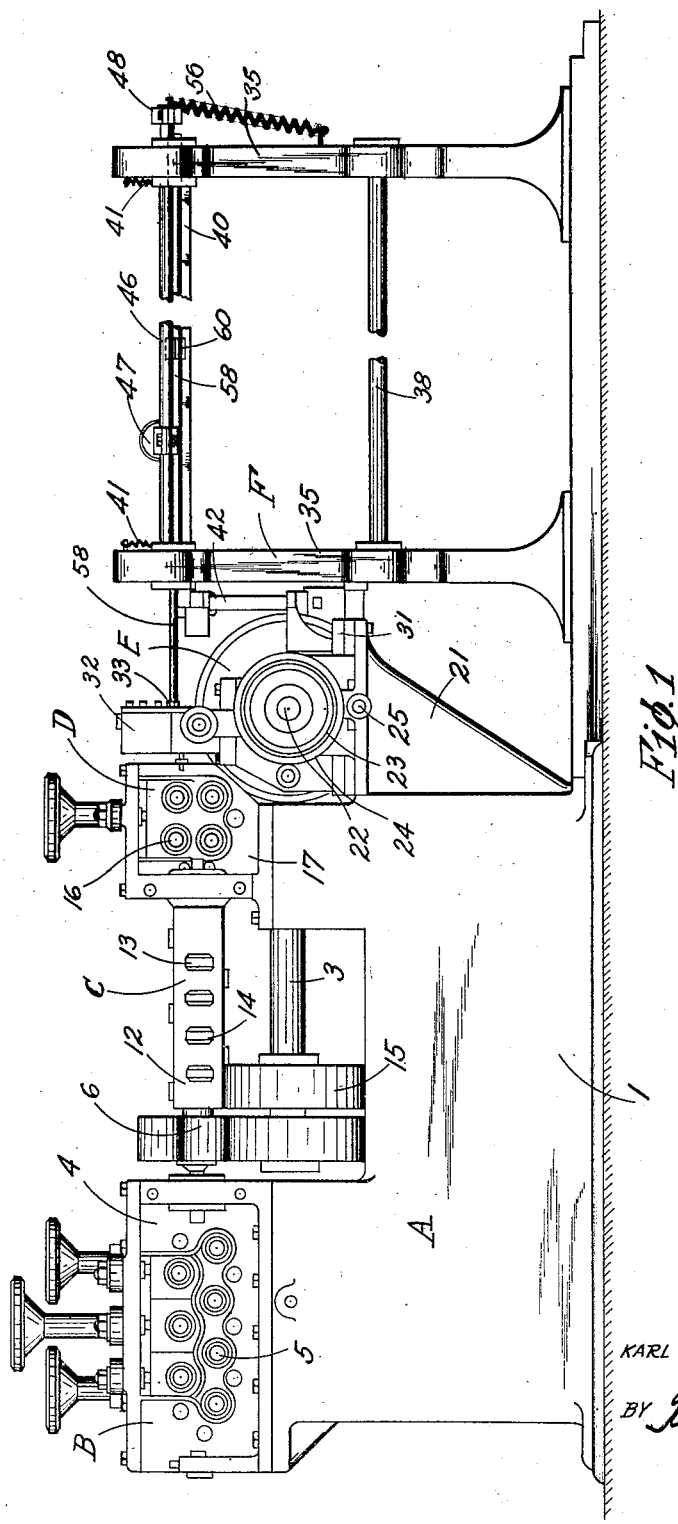

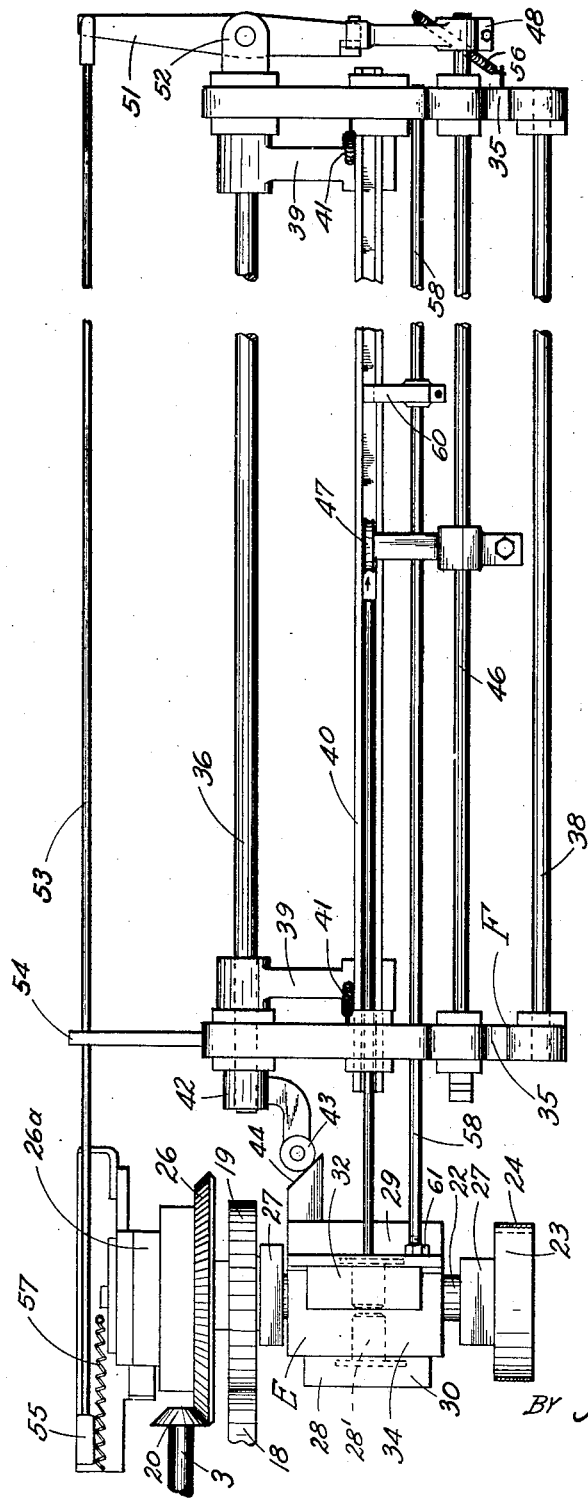

1,911,150

UNITED STATES PATENT OFFICE

KARL WILLIAM HALLDEN, OF THOMASTON, CONNECTICUT

SHEARING APPARATUS FOR CUTTING POSITIVE LENGTHS

Application filed March 2, 1931. Serial No. 519,386.

This invention relates to apparatus for severing moving articles.

The object of this invention is to reduce to a minimum the variation in length in a series of pieces cut from a continuously moving article by an automatic shearing device.

A preferred form of apparatus for practicing this invention embodies a primary trigger to trip the clutch mechanism controlling the cutoff means, and a positive stop device which moves with the shearing device and is engaged by the article to limit the movement thereof relative to the shearing device whereby the exact length desired may be cut off.

Other objects, more or less ancillary to the foregoing and the manner in which all the various objects are realized will appear in the following description, which, considered in conjunction with the accompanying drawings, sets forth one embodiment of the invention.

Figure 1 is a side elevation partly broken away of an assembled device embodying the present invention and adapted for use on wire.

Figure 2 is a top plan view of the device illustrated in Figure 1.

Figure 3 is a fragmentary perspective view of the mechanism for storing and operatively discharging articles severed by the cutoff mechanism, and including parts of the tripping and positive stop mechanism.

Figure 4 is a fragmentary perspective view of the latch and trip lever assembly.

For convenience in description, I have elected to consider the devices illustrated herein from the point of view of an observer looking toward the apparatus and the direction of approach to it by the moving article to be severed; and accordingly will hereinafter refer to the portion of the apparatus toward the on-coming article as being the forward end of the apparatus and where the severed articles are collected as the rear end of the apparatus. Further, in order to simplify the description of the apparatus of the drawings, I have elected to segregate various parts of the mechanism and will refer to these parts by reference characters A, B, C, D, E and F.

"A" designates the base which carries the part B which includes preliminary article straightening rolls having fixed longitudinal axes, the part C which includes rotative straightening mechanism, the part D which includes feed rolls for delivering the moving article to be severed, the part E which includes apparatus for severing the moving article, and the part F which includes mechanism for receiving the severed articles.

It will be understood, however, that inasmuch as the invention claimed herein is primarily directed to the parts E and F, the parts B and C may be omitted and a suitable base for supporting the part E may be substituted for the base herein shown.

The base A is intended primarily as a support for the parts B, C, D and E and may consist of a hollow casting which is suitably formed to support these parts and, if desired, to carry a suitable driving motor (not shown) and power line or shaft 3 for actuating any one or all these parts B, C, D and E.

The part B comprises a suitable supporting member 4 carrying a plurality of rollers 5 suitably shaped for wire, certain of which rollers may be adjusted with respect to the others to permit the application of any desired degree of bending force on a moving article passing between these rollers and to remove largely any kinks and bends from the moving article. These rollers 5, as illustrated are driven by the motor through shaft 3 and suitable gearing 6.

The part C comprises a cylindrical housing 12 rotatably mounted in journals disposed at the forward end in the member 4 and at the rear end in a member of part D. This cylindrical member 12 is provided with a plurality of transverse adjustably suitably grooved wire engaging guides 13, located in the openings 14 in the member 12. The member 12 may be rotated by any satisfactory means, such for example, as a pinion gear keyed thereto at its forward end and meshing with a driven gear 15 keyed on the drive shaft 3. A metallic wire passing through the member 12 and engaging with the spaced guides 13 therein, which are preferably slidably staggered or out of true alignment lengthwise of the member 12, will be substantially free from slight kinks and bends and will issue from the rear of the member 12 in a substantially straight condition.

The part D comprises one or more sets, in this case two sets of feed or pinion rolls 16 rotatably and adjustably mounted in a suitable supporting member 17 driven by gear 18 (Figure 2) connected thereto and meshing with a gear 19 carried by the main shaft 22 of the cut-off device in part E which is driven from a beveled pinion 20 keyed to the shaft 3. The function of these rolls is to feed an article to be severed through the cut-off mechanism of part E.

The cut-off mechanism of part E (see Figures 1 and 2) may be described as follows: a suitable supporting base 21 attached to the base 1 carries a single revolution, rotatable shaft 22 having a fixed longitudinal axis. This shaft 22 has keyed thereto at one end a brake drum 23 about which a brake band 24 is adjustably clamped which band is pivotally secured as at 25 to the base 21. The shaft 22 carries at its other end a clutch housing 26a having keyed thereto the gear 19 and the bevel gear 26 meshing with the beveled pinion 20 keyed on the main drive shaft 3. The gear 19 meshes with the gear 18 to drive the feed rolls 16.

Intermediate the bearings 27 of the shaft 22 is disposed a reciprocable carriage 28 having two spaced parallel legs 29 and 30 slidably engaging the base 21 and retained thereon by the strip 31. The legs 29 and 30 carry an upright body 32 provided with an opening 33 through which the moving wire to be severed may be passed and constituting the lower or vertical stationary blade of a shear. The upper or vertically moving blade 34 of such shear is disposed on the body 32 of the carriage to slide in the vertical plane thereof. The structure and operation of the shearing device E is similar to that disclosed and described in my co-pending application, Serial No. 271,715, filed April 21, 1928 and it is therefore believed to be unnecessary to describe this device in further detail as the present invention does not alter the construction or operation of the cut-off mechanism of that application corresponding to part E hereof.

Part F (see Figures 1, 2 and 3) comprises a plurality of upright standards 35 suitably mounted on a slotted floor plate and spaced apart from, but preferably secured to each other by means including a rod 38. The standards 35 are shaped as at 37 to receive and store pieces cut from the moving wire. Rod 36 carries a plurality of arms 39 which support at their free ends a part of the trough-like wire supporting structure 40 in which the wire to be severed slides until it is sheared by the part E. These arms 39 are retained in the position shown in Figure 3 by the springs 41 but are movable downwardly against these springs by the rotation of the rod 36 to which they are keyed; a lever 42 also keyed to the shaft 36 carries a roller 43 which engages with the faced off portion 44 of the extension of carriage 28. When the carriage 28 moves rearwardly the surface 44 engages the roller 43 and thereby rotates rod 36 and moves the trough 40 downwardly, thus permitting the wire to be pushed downwardly by the blade of the shearing device without bending and to fall on the other inclined surface 37 of the standard 35.

The standards 35 also carry a rod 46 rotatable therein and provided with a wire engaging roller 47 normally disposed in the trough in the path of the on-coming wire to be severed. This rod 46 has secured thereto at its rear end a latch 48. The latch 48 has secured thereto at its outer-most end a lug 49 which engages behind a raised portion 50 secured on the lever 51. The latter is pivotally secured to the rear standard 35 as at 52 and carries at its outer end a rod 53 slidable in suitable guides 54 and extending to the forward end of the part F where it is attached to a member in the form of a bracket 55 which is pivoted to the base 1 in operative relation to the clutch mechanism 26a which controls the operation of the shearing mechanism. The latch 48 is normally held in locked position by the spring 57 to actuate the clutch mechanism.

The standards 35 are adapted to carry a rod 58 which is slidably mounted in the brackets 59 and has secured thereto a stop arm 60 which is normally disposed in the trough of the on-coming wire rearwardly of the member 47. This arm is adapted to be engaged by the wire or rod to be cut just prior to or approximately at the same time as the knife contacts with the tube or rod to cut the same. As the tube or rod contacts with the stop 60 just prior to the engagement of the knife with the wire or rod the latter may either buckle slightly in advance of the cut-off device or may slip slightly in the feed rolls. This positive stop is adjustably secured in any predetermined place on the rod 58; the latter being secured to the carriage 28 as at 61 and is adapted to move therewith.

In carrying out my invention, continuously moving wire or the like, to be severed into pieces of substantially uniform length, is passed between the rotating rolls of part B, where the large kinks and bends are smoothed out and then through the rotating member 12 of part C, where the smaller kinks and bends are removed. The material then passes between feed rollers 16 of part B and is introduced into the opening 28' in the carriage 28 of the shearing mechanism. As the material passes through the carriage it moves along the trough 40. Disposed in the trough 40 is the roller 47 which is adapted to be lifted or raised by the material passing therein. Raising of the roller 47 causes rotation of the rod 46 to which the arm carrying the roller 47 is secured. Rotation of the rod 46 causes disengagement of the latch 48 and the arm 51, the latter having the rod 53 secured thereto. The release of the rod 53 permits the spring 57 to actuate the clutch mechanism which is effective to cause simultaneously the movement of the carriage with the article to be severed and the shearing mechanism carried by the carriage. Due to the fact that there is a varying amount of lag in the operation of the mechanism hereinabove described, after the material has passed under the wheel 47 the positive stop 60 is disposed in the trough which does not permit the material to move any further relative to the carriage. If the lag of the mechanism is such that the material has a tendency to jam against the stop 60, the material will slip a slight amount in the feed rolls. The stop 60 is set for the exact length desired and the trip or wheel 47 is set ahead far enough so that slippage under ⅛ of an inch will take place in the feed rolls. This slippage is not enough to mark the article, but permits all pieces to be of exact length, in view of the fact that the trip is so set that the cut would be ⅛ of an inch over length or less.

Although the foregoing description is necessarily of a detailed character in order to completely set forth this invention it is to be understood that the specific terminology is not intended to be restrictive or confining and it is further understood that various rearrangements of parts and modifications of structural detail may be resorted to without departing from the scope or spirit of the invention herein claimed.

I claim:

1. Apparatus for severing a moving article comprising a cutter, means for periodically moving said cutter with the article and actuating the same to cut off predetermined lengths of the article, means controlled by the article for actuating the cutter moving means, and means engageable with the end of the article for resisting further movement of the article with respect to the cutter when the predetermined length to be severed has moved past the cutter.

2. Apparatus for severing a moving article comprising a cutter, means for periodically moving said cutter with the article and actuating the same to cut off predetermined lengths of the article, means adapted to be displaced by the passage of the article for causing the actuation of the cutter moving means, and means disposed in the path of the moving article and adapted to be engaged by the end thereof for preventing further movement of the article with respect to the cutter when the predetermined length to be severed has moved past the cutter.

3. Apparatus for severing a moving article comprising a cutter, means for periodically moving said cutter with the article and actuating the same to cut off predetermined lengths of the article, means adapted to be displaced by the passage of the article for causing the actuation of the cutter moving means, and an adjustable stop carried by the cutter and arranged to engage the end of the article and prevent further movement thereof with respect to the cutter.

4. Apparatus for severing a moving article comprising a base, a carriage movable along said base, a reciprocable cutting member mounted on said carriage, a support for receiving the length of the article to be severed, clutch means for moving said carriage and reciprocating said cutting member, a trip adjacent said support and arranged to be released by the moving article to actuate said clutch means and a stop carried by said carriage and disposed on said support to contact the end of the moving article.

5. Apparatus for severing a moving article comprising a base, a carriage movable along said base, a reciprocable cutting member mounted on said carriage, a support for receiving the length of the article to be severed, clutch means for moving said carriage and reciprocating said cutting member, a trip adjacent said support and arranged to be released by the moving article to actuate said clutch means, and means engageable with the end of the article for resisting further movement of the article with respect to the cutter when the predetermined length to be severed has moved past the cutter.

6. Apparatus for severing a moving article comprising a base, a carriage movable along said base, a reciprocable cutting member mounted in said carriage, a support for receiving the length of the article to be severed, clutch means for moving said carriage and reciprocating said cutting member, a trip adjacent said support and arranged to be released by the moving article to actuate said clutch means, and means arranged to contact the end of the article to prevent further movement of the article with respect to the cutter when the predetermined length to be severed has moved past the cutter.

7. Apparatus for severing a moving article comprising a base, a carriage movable along said base, a reciprocable cutting member mounted in said carriage, a support for receiving the length of the article to be severed, clutch means for moving said carriage and reciprocating said cutting member, a trip adjacent said support and arranged to be released by the moving article to actuate said clutch means, and an adjustable stop carried by the cutter and arranged to engage the end of the article and prevent further movement thereof with respect to the cutter.

8. Apparatus for severing a moving article comprising a cutter, means for periodically moving said cutter with the article and actuating the same to cut off predetermined lengths of the article, means adapted to be displaced by the passage of the article for causing the actuation of the cutter moving means, means arranged to contact the end of the article to prevent further movement of the article with respect to the cutter when the predetermined length to be severed has moved past the cutter, said means adapted to be engaged by the article just prior to the cutting operation.

9. Apparatus for severing a moving article comprising a cutter, means for periodically moving said cutter with the article and actuating the same to cut off predetermined lengths of the article comprising a base, a carriage movable along said base, a reciprocating cutter member mounted on said carriage, clutch means for moving said carriage and reciprocating said cutting member; means engageable by said article for actuating said clutch means, means arranged to contact the end of the article to prevent further movement of the article with respect to the cutter when the predetermined length to be severed has moved past the cutter, said last mentioned means comprising a stop adapted to be engaged by the article just prior to the cutting operation.

10. Apparatus for severing a moving article comprising a cutter, means for periodically moving said cutter with the article and actuating the same to cut off predetermined lengths of the article, and means engageable by the moving article for causing the cutter moving means to actuate and means for precluding relative longitudinal movement of the cutter and the article.

In testimony whereof I hereunto affix my signature.

KARL WILLIAM HALLDEN.